United States Patent [19]

Tuninetti

[11] 4,145,727
[45] Mar. 20, 1979

[54] CASSETTE CONTROL MECHANISMS FOR MAGNETIC CASSETTE TYPE RECORDERS

[75] Inventor: Domenico Tuninetti, Rome, Italy

[73] Assignee: SPEM-Societa Prodotti Elettroni Meccanici a.r.l., Rome, Italy

[21] Appl. No.: 830,680

[22] Filed: Sep. 6, 1977

[51] Int. Cl.$^2$ .................. G11B 15/68; G11B 25/00
[52] U.S. Cl. ........................... 360/137; 360/96
[58] Field of Search ................... 360/93–96, 360/137; 242/198

[56] References Cited

U.S. PATENT DOCUMENTS

| | | | |
|---|---|---|---|
| 3,807,653 | 4/1974 | Van Der Maaden | 360/96 |
| 3,902,193 | 8/1975 | Hapke | 360/96 |
| 3,997,918 | 12/1976 | Cicatelli | 360/137 |
| 4,031,554 | 6/1977 | Umeda | 360/96 |
| 4,041,041 | 3/1977 | Cicatelli | 360/96 |
| 4,071,857 | 1/1978 | Whitney | 360/96 |
| 4,071,860 | 1/1978 | Watanabe | 360/96 |

Primary Examiner—Jay P. Lucas
Attorney, Agent, or Firm—DeLio and Montgomery

[57] ABSTRACT

The cassette receiving chamber in a cassette tape recorder is constructed on a movable support that can elevate and lower the cassette into and out of the operating position while maintaining the cassette in a stable constant orientation. It is constructed of two substantially identical U-shaped elements that cross legs in shifting the chamber in the fashion of scissors.

3 Claims, 6 Drawing Figures

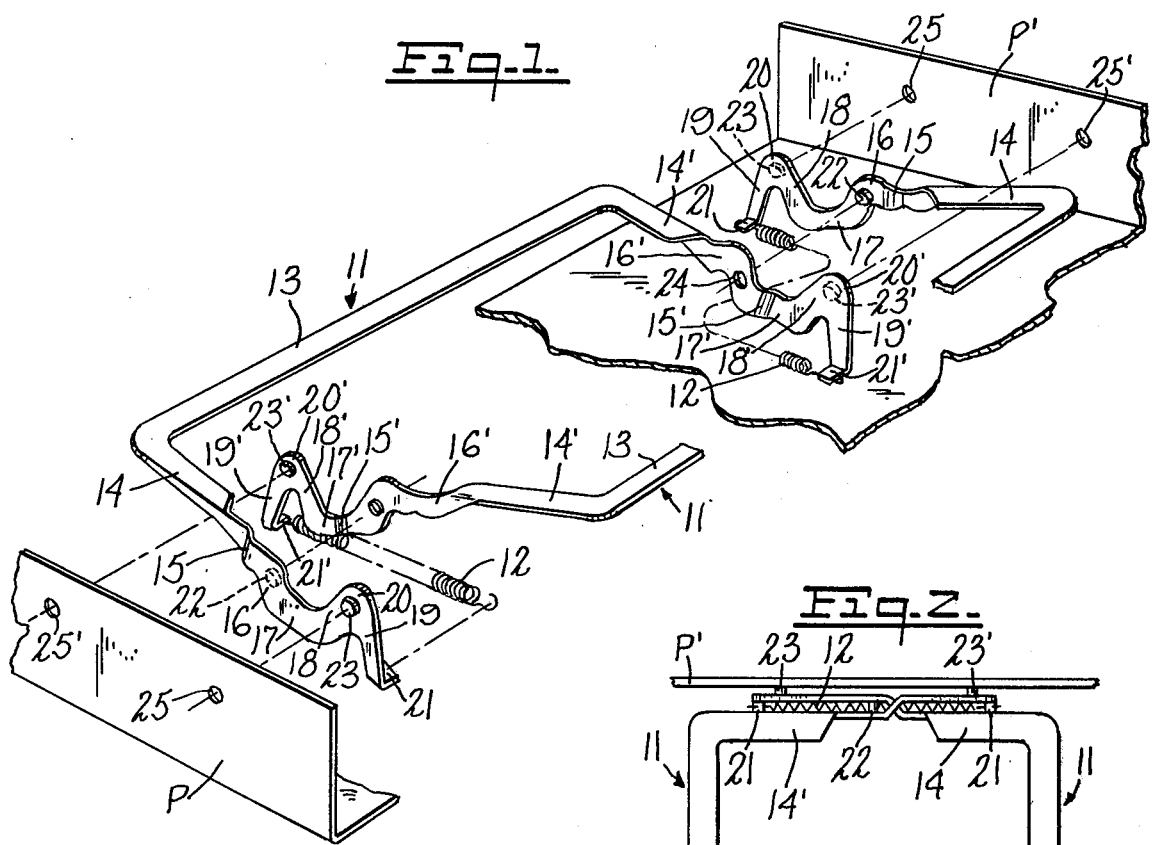

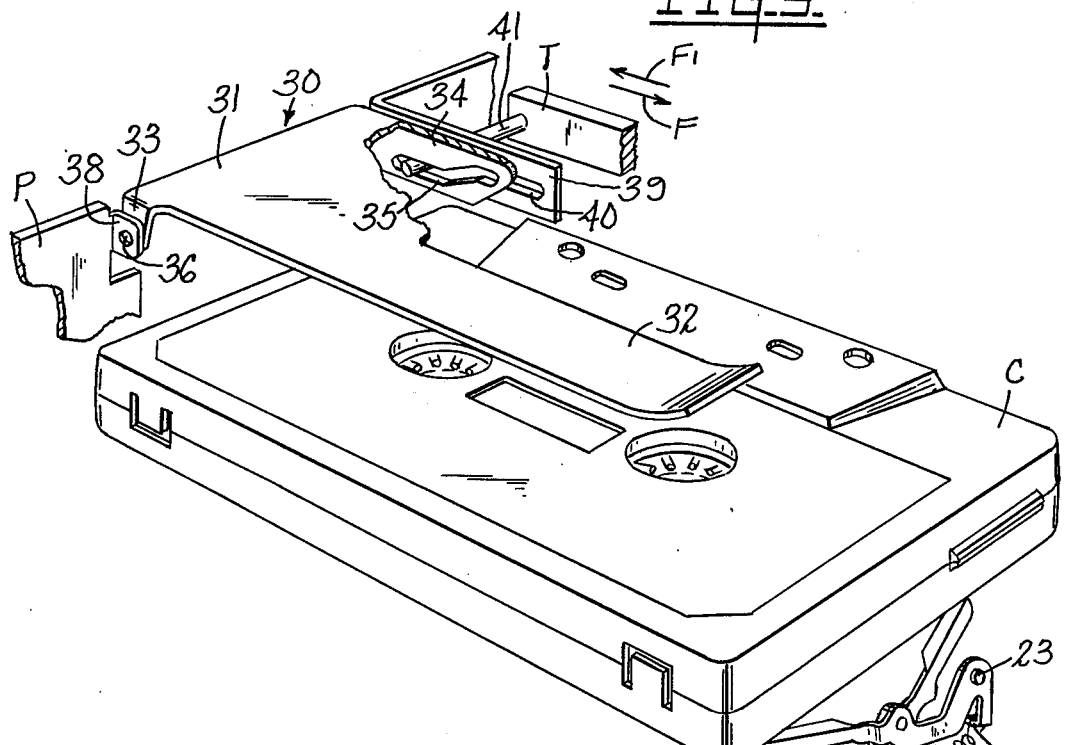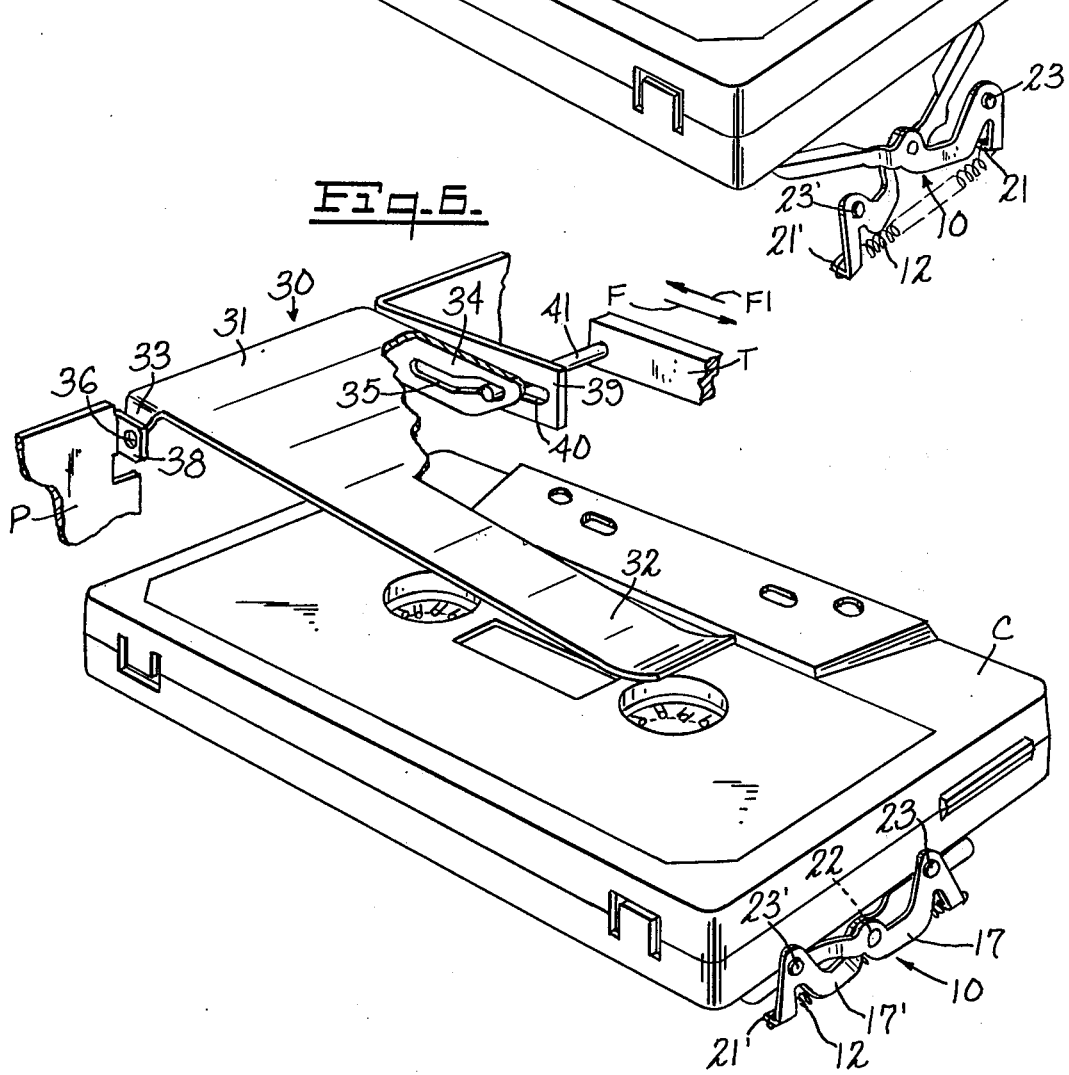

CASSETTE CONTROL MECHANISMS FOR MAGNETIC CASSETTE TYPE RECORDERS

This invention relates to an improvement in the cassette control devices, moving the cassettes in magnetic cassette-recorders, which allows a significant reduction in the space required in the recorder case to house the device, while providing the cassette, to be introduced into the recorder, with a perfect movable and resilient supporting plane.

None of the known devices used for controlling the movements of the cassette in cassette-type recorders is completely satisfactory, since they are extremely bulky and, accordingly, waste space and, moreover, the operation thereof is not reliable since they are not self-adjusting to all cassette sizes. Furthermore, such devices are complicated and comprise a great deal of different parts and are costly.

It is known that the magnetic tape cassettes available on the market are not of the same thickness. Thus, these different types of cassette raise significant problems of clearance and particularly this occurs in the apparatuses using control devices including a "basket", i.e. a housing of rectangular cross section, wherein all dimensions are fixed; consequently, the corresponding dimension thereof must be such as to house also the cassettes of the largest thickness. Accordingly, the cassettes of lesser thickness are housed with relevant clearance and move within the housing with all the disadvantages associated therewith.

It is accordingly an object of the invention to provide a control device for controlling the movements of the cassettes, occupying a minimum space and affording an optimal operation with cassettes of any thickness.

A further object of the invention is to provide a device comprising a minimum number of easily assemblable parts which, accordingly, is not costly.

The cassette control device of the invention may be compared with "basket" devices as for accuracy in the introduction of the cassettes, but it is completely free from the above stated drawbacks of "basket" devices since the device of the invention is self-adjusting to the different thickness of the cassette, as it will be evident below.

This device generally comprises a resilient articulated movable frame which continuously provides a perfect movable plane supporting the cassettes, and a control member therefor.

The articulated resilient frame has the advantage of comprising only two main elements identical with each other, pivoted to the side walls defining the cavity wherein the cassette moves vertically between an introduction position and an operating position, these two elements being pivoted to each other and connected by a spring member, and a coil spring.

The control member is adapted to exert a force on an area of the cassette top surface and to cause the cassette and the articulated frame supporting the same to move together. This control member cooperates with this frame between the introduction position and the operating position.

The invention will be now described in detail with reference to the annexed drawings, wherein:

FIG. 1 is an exploded view of the movable articulated frame with the walls defining the housing of the cassette being omitted or partially cut away;

FIG. 2 is a top view of the frame of FIG. 1;

FIG. 3 is an end elevational view of the frame in the upper position with a cassette resting thereon, the frame being housed within a cassette recorder;

FIG. 4 is a view similar to FIG. 3 with the frame in the lowered position;

FIG. 5 is a fragmentary view showing a cassette located between the frame according to the invention and the lever control member, in the upper position; and, FIG. 6 is a view similar to FIG. 5 with the frame in the lowered position.

Referring now to FIGS. 1, 5 and 6 the device according to the invention substantially comprises a frame 10 and a lever control member 30 for lowering the cassette to the operating position and lifting the same to the introduction and ejection position thereof. Frame 10 comprises two elements 11 identical with each other, connected through springs 12 and pivoted to each other and to walls P and P' defining space A for cassette C.

Each element 11 of frame 10 has generally a wide or flattened U-shape comprising a long straight portion 13, having preferably an L-shaped cross section, and two end brackets 14 and 14' slightly different from each other and perpendicular to straight portion 13.

Bracket 14 has a straight length connected to one end of straight portion 13, which length has similarly an L-shaped cross section, and a portion offset outwardly of bracket 14 at point 15.

As better shown in the side view of FIG. 4, the outwardly offset portion has a first short wave-shaped length 16, a length 17 parallel to the straight length but below the same and a wave-shaped length comprising oppositely sloped sides 18 and 19 longer than length 16 in order to enhance the wave-shape of the latter. Therefore, merging point 20 is at a higher level than the merging point of length 16.

End 21 of length 20 is inwardly bent at right angle and provides a hook for one looped end of a coil spring 12.

Bracket 14' is symmetrical with bracket 14, except for offset point 15' thereof which is approximately at the middle point of corresponding straight length 17', instead of being approximately at the merging point between the straight length of L-shaped cross section and the wave-shaped length 16. All other portions 18', 19', 20' and 21' of bracket 14' correspond in shape and size to relative portions 18, 19, 20 and 21 of bracket 14.

Furthermore, each bracket 14 has two short pins, indicated with references 22 and 23, formed by the blanking process. Pin 22 extends from inner face of length 16 and pin 23 extends from outer face of region 20, where sides 18 and 19 merge with each other.

On the contrary, each bracket 14' is provided with a single short pin, indicated with reference 23', and it extends from the outer face of area 20' where sides 18' and 19' connect with each other. Moreover a slightly slotted opening 24 is provided on this bracket and more exactly in the region where length 16' and length 17' merge with each other.

As easily seen in the drawings, in order to assemble frame 10, two elements 11 are placed with bracket 14 of the first element crossing bracket 14' of the second element and with pin 22 of each bracket 14 fitted through opening 24 of corresponding bracket 14'. Moreover, pins 23 and 23' are fitted in corresponding openings 25, 25' provided in walls P and P' defining space A intended to house cassette C.

In this way frame 10 comprised of elements 11 thus assembled, is articulated both at the pivoting point provided by pin 22 and opening 24 and to walls P and P' by pins 23 and 23' fitted through corresponding openings 25 and 25'. Openings 25 and 25' can be similarly slotted to allow complete articulation of from 10 which can be thus lowered from the position of FIG. 3 to the position of FIG. 4.

With elements 11 being assembled as described above, looped ends of springs 12 are hooked on bent portions 21 and 21' and they resiliently connect elements 11, articulated to each other and to walls P and P' to form frame 10. Thus, springs 12 normally maintain elements 11 in the upper position shown in FIG. 3, and resiliently yield to allow elements 11 to lower in the position of FIG. 4, when control member 30 exerts a force on frame 10 through the cassette inbetween.

It is now useful to point out the extreme simplicity both of elements 11, identical with each other and formed by blanking and pressing process from a metal sheet of small thickness, and of assembling the elements required to form frame 10, this simplicity contributing to minimize the cost of the device realized according to the invention.

In a presently preferred embodiment of the invention, control member 30 substantially comprises an element 31 pressed from a metal sheet of small thickness, having a resilient arm 32 extending from a base portion which is bent at the ends thereof to provide tabs 33 and 34.

Tab 34 is longer than tab 33 and has an S-shaped slot therein.

Aligned pins 36, only one of which is shown in FIG. 5, are provided on the outer face of both tabs 33 and 34, the pins being adapted to be fitted through corresponding holes 37 provided on tabs 38 and 39 which are obtained by blanking and bending the upper portion of wall P of space A housing the cassette.

Longer tab 39, provided with a straight slot 40, is on the same side as tab 34 and a long pin 41, integral with a sliding actuator T, extends through slots 35 and 40, actuator T being adapted to reciprocate parallel to the direction of slot 40.

It is also useful to point out that the push down member is a single element pressed from a resilient metal sheet on which simple blanking processes are performed. Moreover, also tabs 38 and 39, providing a support for the pressed element, are obtained from wall P' through simple blanking and bending process, so that manufacturing costs are reduced. This, together with the reduced cost of the simple assembling operation required, minimizes the overall cost of the device.

Actuator T is a part of the invention only as actuator T controls push down member 31. Indeed, upon introduction of a cassette in space A through opening IF, actuator T trips in the direction of arrow F (FIG. 5) and in turn causes member 31 to trip down due to pin 41, straight slot 40 and S-shaped slot 35.

Arm 32 of member 31 pushes down cassette C against the bias of movable frame 10 which, as stated above, is biassed in the upper position by the action of springs 12.

While lowering owing to the force exerted by arm 32, frame 10 extends in correspondence of both straight portions 13 and 21, 21' against the bias of springs 12 and it accommodates within the shallow cavity between the bottom surface of cassette C and the toothed wheels driving the tape (not shown) completely below the pivot means comprising pins 23, 23' fitted through openings 25, 25'.

It is now necessary to point out that the system used for moving element 32 allows all stresses due to the movement of the control member to be discharged onto the recorder case through tab 39 integral with the wall P' thereof.

Upon ending of the tape, a device of a known type controls actuator T which trips in the direction of arrow F' of FIG. 5, so that bracket 32 controlled by pin 41 rises again and releases cassette C which is lifted by frame 10 to the level of introduction opening IF. At this point, a second spring device, which forms no part of the invention and is not shown, will eject the cassette.

It is to be understood that the embodiment of the control member cooperating with frame 10, herein described and illustrated, is only a preferred embodiment thereof and, according to the invention, other push members for controlling the cassette resting on frame 10 can be used in combination therewith.

It is evident from the foregoing that this device applies the principle of obtaining parallel movements of a rigid flat element to cassette type recorders, making use of the combination of an element providing a portion of plane always moving parallel to itself for supporting the flat element, with a force being exerted onto a region, even a region as reduced as a dot, located within the contour of this portion of plane. It is therefore intended that the invention is not restricted to a particular embodiment of the above combination which will be obtained also using elements, parts and combination of parts different from those illustrated and described above, provided that they are within the concepts and the scope of the invention.

I claim:

1. In combination with a tape recorder of the cassette type defining a chamber adapted to house a cassette, wherein the cassette can move between an introduction and ejection position and an operating position, control means for moving said cassette comprising the combination of:

(i) a movable support element adapted to support said cassette in constant orientation, said movable support element comprising a resilient frame having two substantially identical U-shaped elements pivotable relative to each other and relative to said chamber, said U-shaped elements each comprising a straight portion and parallel first and second arms orthogonal thereto, said arms of one U-shaped element being each first pivotally mounted to one of the arms of the other U-shaped element intermediate the ends of each of the arms, each of said arms being secondly pivotally mounted to said housing intermediate the first pivotal mount and the end of said arms;

(ii) resilient means between the ends of the respective pairs of pivotally mounted arms biasing said ends together; and (iii) a push element adapted to exert a force on one point of the face of the cassette opposite the face engaging the support element to force the cassette to move between the introduction and ejection position and the operating position.

2. The device according to claim 1, wherein said resilient arm providing said push elements comprises a pressed member having a base with bent ends to provide a first tab and a second tab, said second tab being longer and provided with an S-shaped slot, said tabs having two aligned pins outwardly extending from the outer face thereof and wherein two further first and second tabs are provided on one of said walls, the first tab being shorter and provided with a hole, the second tab being longer and provided with a hole aligned with said hole of said first tab, and a straight slot, and wherein said actuator is parallel to said second tabs and is provided with a long laterally extending pin, whose end passes through both said straight slot and said S-shaped slot, when the arm is mounted on the wall, said pins of said base tabs being fitted in said corresponding holes of said wall tabs, so that any linear movement of said actuator causes said bracket to pivot about said couple of supporting pins, the stresses due to said movement being discharged on said longer wall tab and, accordingly, on said recorder frame.

3. The device according to claim 1, wherein said bracket is mounted on said recorder wall facing the cassette introduction and ejection opening and above said frame, the parts being so arranged that the introduction of a cassette in said recorder, below said bracket, causes said actuator to snap back and said bracket to pivot downwardly lowering said cassette resting on said frame, against the resilient action of said springs and then pushing the cassette to the lowered operating position, while when said actuator snaps in the opposite direction, the actuator causes said bracket to pivot upwardly so that said frame rises, owing to the bias of said springs thereof, lifting again said cassette to said introduction and ejection position thereof.

* * * * *